United States Patent
Gerber et al.

(10) Patent No.: US 10,251,328 B2
(45) Date of Patent: Apr. 9, 2019

(54) ELECTRONIC SENSOR ASSEMBLY FOR MONITORING SMOOTHING TOOLS OF A HARROW

(71) Applicant: CNH Industrial America LLC, New Holland, PA (US)

(72) Inventors: Rick L. Gerber, Roanake, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 43 days.

(21) Appl. No.: 15/355,906

(22) Filed: Nov. 18, 2016

(65) Prior Publication Data

US 2018/0139891 A1    May 24, 2018

(51) Int. Cl.
| | |
|---|---|
| A01B 63/10 | (2006.01) |
| A01B 63/32 | (2006.01) |
| A01B 19/04 | (2006.01) |
| A01B 63/00 | (2006.01) |
| A01B 49/02 | (2006.01) |
| A01B 29/04 | (2006.01) |

(52) U.S. Cl.
CPC .............. *A01B 63/32* (2013.01); *A01B 19/04* (2013.01); *A01B 49/02* (2013.01); *A01B 63/002* (2013.01); *A01B 29/046* (2013.01)

(58) Field of Classification Search
CPC ... A01B 29/041; A01B 33/087; A01B 63/002; A01B 63/10; A01B 63/111; A01B 63/114
USPC .......... 172/4.5, 10, 149, 150, 170, 175, 177
See application file for complete search history.

(56) References Cited

U.S. PATENT DOCUMENTS

| | | |
|---|---|---|
| 4,202,155 A | 5/1980 | Stewart |
| 4,600,060 A | 7/1986 | Winter et al. |
| 4,607,716 A | 8/1986 | Beck |

(Continued)

FOREIGN PATENT DOCUMENTS

| | | |
|---|---|---|
| EP | 1961283 B1 | 8/2008 |
| EP | 2633747 A1 | 9/2013 |

(Continued)

OTHER PUBLICATIONS

Victor Rueda-Ayala et al.; "A Non-Chemicai System for OnlineWeed Control"; Article in Open Access Sensors; Jan. 1, 2015; Retrieved from: www.mdpi.com/1424-8220/15/4/7691/pdf; pp. 7691-7707; US.

(Continued)

*Primary Examiner* — Gary S Hartmann
(74) *Attorney, Agent, or Firm* — Rebecca L. Henkel; Rickard K. DeMille (57) ABSTRACT

An agricultural tillage implement is provided which includes an electronic sensor assembly supported by a harrow frame and in communication with a hydraulic system. The electronic sensor assembly includes a pivoting arm movable in conjunction with the movement of a first set of smoothing tools and is configured to generate an electrical signal corresponding to the angle of the first set of smoothing tools. The electrical signal is transmitted to a controller and/or an operator in the tractor cab for continuously monitoring the angle of the smoothing tools. The electrical signal is used to allow for the continuous adjustment of the smoothing tools during a tilling session.

20 Claims, 10 Drawing Sheets

(56) References Cited

U.S. PATENT DOCUMENTS

| | | | | |
|---|---|---|---|---|
| 5,561,924 | A | * | 10/1996 | Ramey ................ E02F 3/6454 172/4.5 |
| 6,626,246 | B2 | | 9/2003 | Gerber et al. |
| 6,688,405 | B2 | | 2/2004 | Steinlage |
| 6,896,068 | B2 | | 5/2005 | Dietrich, Sr. et al. |
| 7,458,428 | B2 | * | 12/2008 | Laudick ................ E02F 3/6481 172/1 |
| 7,506,692 | B2 | | 3/2009 | Barber et al. |
| 7,766,093 | B2 | | 8/2010 | Becker et al. |
| 8,657,026 | B2 | | 2/2014 | Friesen |
| 9,301,439 | B2 | | 4/2016 | Gilstring |
| 9,485,900 | B2 | * | 11/2016 | Connell ................ A01B 76/00 |
| 2006/0108130 | A1 | | 5/2006 | Defrancq |
| 2008/0257571 | A1 | | 10/2008 | Keane et al. |
| 2011/0203817 | A1 | * | 8/2011 | Hanson ................ A01B 49/027 172/150 |
| 2015/0216101 | A1 | | 8/2015 | Zabel et al. |
| 2016/0234994 | A1 | | 8/2016 | Gray et al. |
| 2017/0064900 | A1 | * | 3/2017 | Zemenchik ............ A01B 71/02 |
| 2017/0079189 | A1 | * | 3/2017 | Steinlage ............ A01B 61/044 |
| 2017/0079192 | A1 | * | 3/2017 | Steinlage ............ A01B 63/245 |
| 2017/0079197 | A1 | * | 3/2017 | Steinlage ............ A01B 73/044 |

FOREIGN PATENT DOCUMENTS

| | | |
|---|---|---|
| JP | 2009296931 A2 | 12/2009 |
| WO | 2002049414 A1 | 6/2002 |
| WO | 2012102667 A1 | 8/2012 |
| WO | 2013026661 A1 | 2/2013 |

OTHER PUBLICATIONS

Heege; "Precision in Crop Farming: Site Specific Concepts and Sensing Methods" Springer Heege Jan. 1, 2013 Reference Notes Retrieved Sep. 18, 2016 from: https://books.google.com/books?isbn=9400767609; ISBN: 9400767609; See Fig. 7.7; p. 155: Bogrekci and Godwin; US.

Bourgault "Bourgault Product Catalog 2017" North America Bourgault Bourgault Retrieved from: http://www.bourgault.com/Portals/0/SiteAssets/Advertising/product_cataloguesA_Bourgault_Product_Catalogue_2017_lo_res.pdf; See bottom 3 images p. 88, text p. 89: Highly visible indicator gauges let the operator know at a glance how the bar is adjusted.; US.

* cited by examiner

ELECTRONIC SENSOR ASSEMBLY FOR MONITORING SMOOTHING TOOLS OF A HARROW

FIELD OF THE INVENTION

The invention relates generally to tillage implements and, in particular, to an agricultural tillage implement with a soil finishing system having a multiple bar harrow supporting smoothing tools, a hydraulic system for adjusting an angle of smoothing tools for use during a tilling session, and a sensor assembly in communication with the hydraulic system for generating a signal corresponding to the angle of the smoothing tools.

BACKGROUND OF THE INVENTION

Tillage implements such as cultivators are getting larger and more complex over time to improve tilling efficiency and seedbed characteristics. For example, cultivators are getting wider to allow tilling more soil in a single pass, which improves equipment productivity. Shanks and other components of the cultivators are also getting larger and more robust to allow increased travel speeds while tilling, which further improves equipment productivity. Further efforts have been made to improve soil leveling and other seedbed characteristics, such as by incorporating soil finishing systems which may include multiple harrows having tines for breaking up and smoothing out the surface of the soil behind main tillage tools of the tillage implements.

It is often desirable to adjust the angle at which the harrows contact the ground during a tilling session. This may be useful depending on the soil's looseness or firmness, or for achieving various effects with the soil. To adjust the angle, pins on each tine support channel of a harrow are typically removed so that they may be moved to a different angle. Then, the pins are replaced. This must be done for each harrow section of the tillage implement.

However, for a typical tillage implement having two mounting arms per harrow section, and as many as 8 harrow sections, this may require the operator to remove, adjust and replace as many as 16 pins. This can be time consuming and physically strenuous. In addition, there are typically only about three positions to choose from for each pin position for achieving various angles. This may be overly limiting in some applications in which more precise control is desired. What is needed is tillage implement having harrows which eliminate one or more of the foregoing disadvantages.

SUMMARY OF THE INVENTION

The present inventors have recognized that by providing an electronic sensor in communication with a hydraulic system for adjusting an angle of smoothing tools of a harrow, the angle of the smoothing tools may be continuously monitored by a controller and/or an operator in the tractor cab. This may allow continuous adjustment of the smoothing tools during a tilling session in order to provide the most aggressive setting for optimum field leveling and residue flow based on field conditions.

Accordingly, in one aspect, a position sensor (which could be magnetic or a potentiometer) may be mounted to a tine channel assembly supporting individual tine bar assemblies. The sensor may continuously monitor the relationship of a desired tine angle controlled with a hydraulic cylinder. Through an electrical bus connection in the tractor, such as an ISO or CAN bus as known in the art, adjustments can be made with the hydraulics to change the tine angle for the most aggressive setting.

Brackets may be provided for mounting the hydraulic cylinder to the tine channel assembly. An inner slide piece may be provided to hook onto an end of the hydraulic cylinder for providing the adjustment of the smoothing tools. Brackets may also be provided for mounting the position sensor and associated wire harness to the tine channel assembly. The position sensor may send a signal to the tractor so that an operator could read the position and adjust the smoothing tools as desired.

A hydraulic cylinder force may be controlled from the tractor cab in order to maintain a desired tine angle setting. The sensor may be mounted to the channel assembly with a pivoting arm of the sensor fixed to the slide. The sensor, in turn, may feed information to a computer in tractor cab, such as via an ISO or CAN bus as known in the art, to provide any necessary adjustments to hydraulic cylinders to maintain the desired tine angle setting. In addition, the operator, having the necessary position information, can adjust the tine angle directly from the tractor cab.

Accordingly, the tine angle setting on a tine harrow can be hydraulically controlled from the tractor cab (on-the-go) and set for the most aggressive setting for optimum field leveling and residue flow based on current field conditions. The position sensor may be used to monitor the tine angle setting by the operator and provide further adjustments or corrections as may be necessary.

Specifically then, one aspect of the present invention may provide an agricultural tillage implement, including: a main implement frame supporting a set of ground-engaging tillage tools for tilling soil during a tilling session for seedbed preparation; and a soil finish system supported by the main implement frame for smoothing the soil tilled by the ground-engaging tillage tools, the soil finish system including: (a) a harrow supported in a trailing position with respect to the main implement frame, in which the harrow includes a harrow frame with multiple bars arranged generally transversely with respect to a travel direction of the agricultural tillage implement, in which the multiple bars support a first set of smoothing tools for smoothing the soil tilled by the ground-engaging tillage tools; (b) a hydraulic system configured to define an angle of the first set of smoothing tools for the tilling session; and (c) a sensor assembly in communication with the hydraulic system. The sensor assembly may be configured to generate an electrical signal corresponding to the angle of the first set of smoothing tools.

Another aspect may provide an agricultural tillage implement, including: a main implement frame supporting a set of ground-engaging tillage tools for tilling soil during a tilling session for seedbed preparation; and a soil finish system supported by the main implement frame for smoothing the soil tilled by the ground-engaging tillage tools, the soil finish system including: (a) a harrow supported in a trailing position with respect to the main implement frame, in which the harrow includes a harrow frame with multiple bars arranged generally transversely with respect to a travel direction of the agricultural tillage implement with the multiple bars of the harrow frame including a front bar arranged toward a front end of the harrow, a back bar arranged toward a back end of the harrow, and an intermediate bar arranged between the front and back bars of the harrow, in which the harrow includes a first set of smoothing tools supported by the front, back, and intermediate bars of the harrow frame for smoothing the soil tilled by the ground-engaging tillage tools; (b) a hydraulic system configured to define an angle of the first set of smoothing tools for the tilling session; (c) a sensor assembly in communication with the hydraulic system, in which the sensor assembly is configured to generate an electrical signal corresponding to the angle of the first set of smoothing tools; and (d) a finishing tool supported in a trailing position with respect to the harrow with the finishing tool including a second set of smoothing tools for smoothing the soil tilled by the ground-engaging tillage tools.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
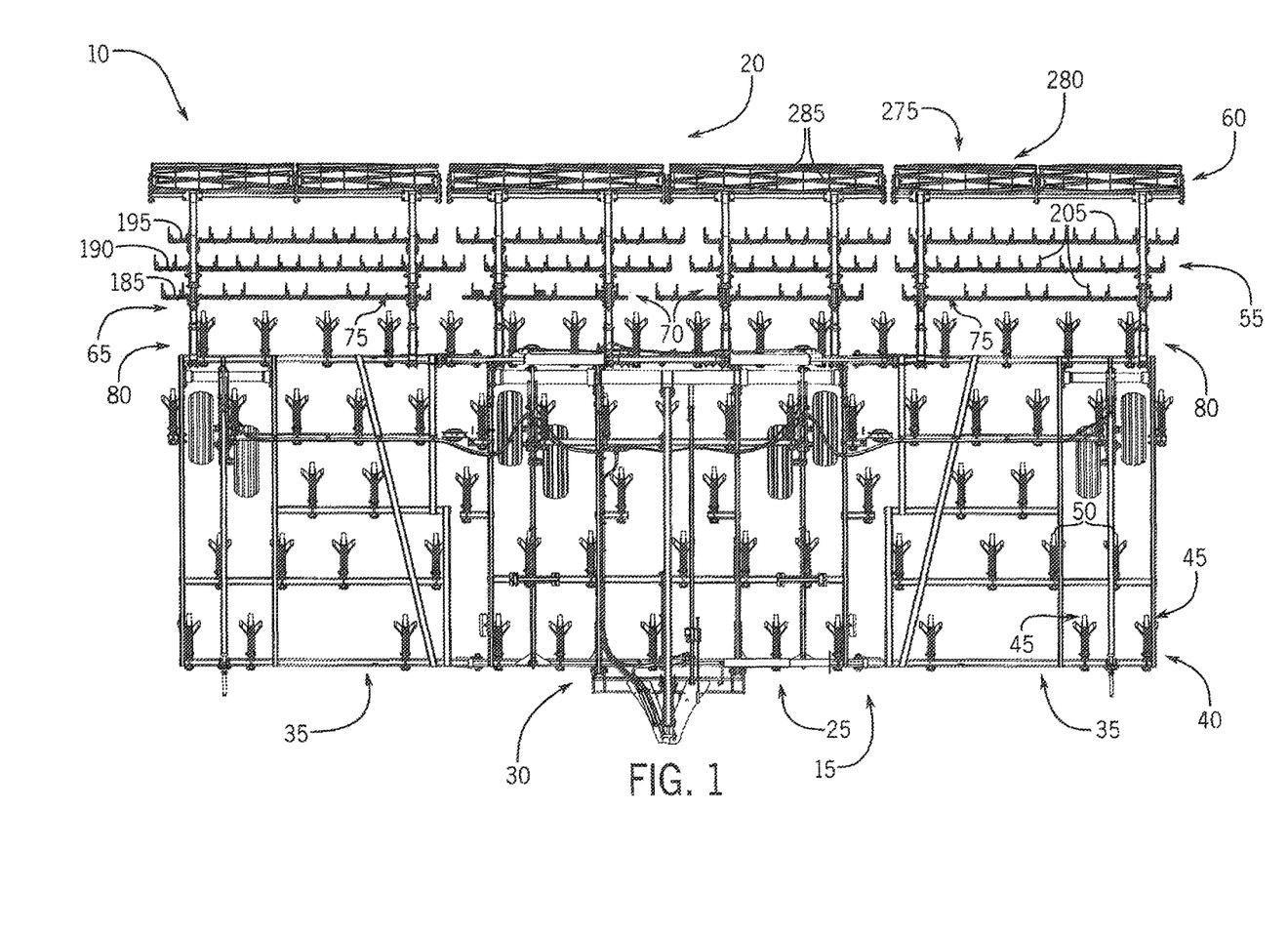
FIG. 1 is a top plan view of an agricultural tillage implement with a soil finishing system having a multiple bar harrow and linear actuator for adjusting an angle of the harrow according to the present invention.

Referring now to the drawings and specifically to FIG. 1, agricultural tillage implement 10 is towable by a tractor (not shown) or other vehicle and is shown with main tillage implement 15 and soil finishing system 20 that improves soil leveling, as explained in greater detail elsewhere herein. Main tillage implement 15 is shown here as a cultivator with main implement frame 25 that has multiple sections, represented as main frame section 30 and outer wing sections 35 on opposite sides of main frame section 30. Main implement frame 25 supports a set of ground-engaging tillage tools 40 for tilling soil during a tilling session for seedbed preparation. Tillage tools 40 are shown here as sweeps 45 mounted to shanks 50 that are attached to main implement frame 25. Although shown as sweeps 45 mounted to shanks 50, it is understood that ground-engaging tillage tools 40 may be other ground-engaging tillage tools, such as coulters, disks, and rippers.

Still referring to FIG. 1, finishing system 20 is shown with harrow 55 arranged trailing behind tillage implement 10 and finishing tool 60 arranged trailing behind harrow 55. Harrow 55 is shown as coil tine harrow 65 with multiple sections, shown as intermediate harrow sections 70 and outer harrow sections 75 on opposite sides of intermediate harrow sections 70.

Figure 2:
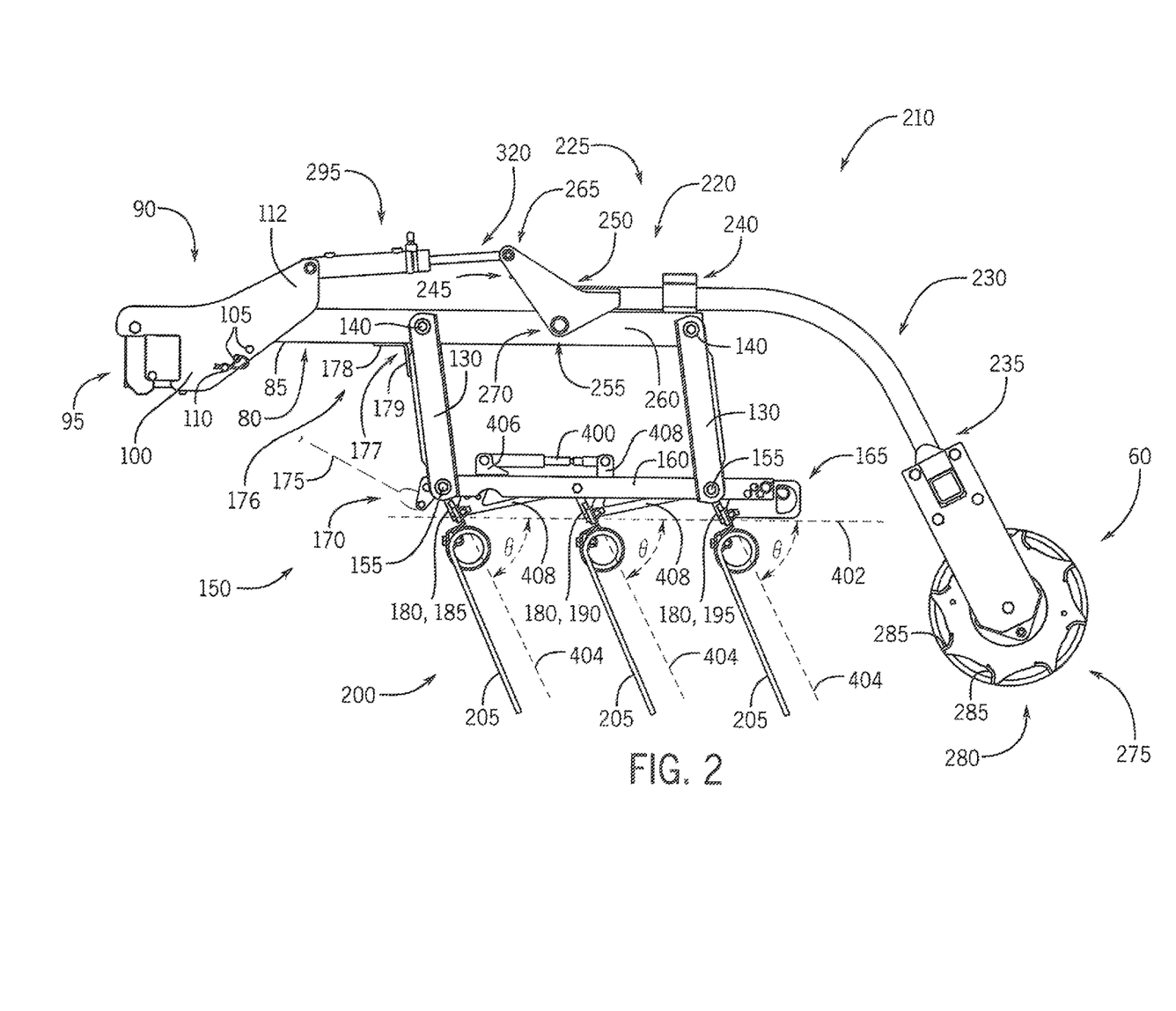
FIG. 2 is a side elevation view of the soil finishing system of FIG. 1.
Figure 3:
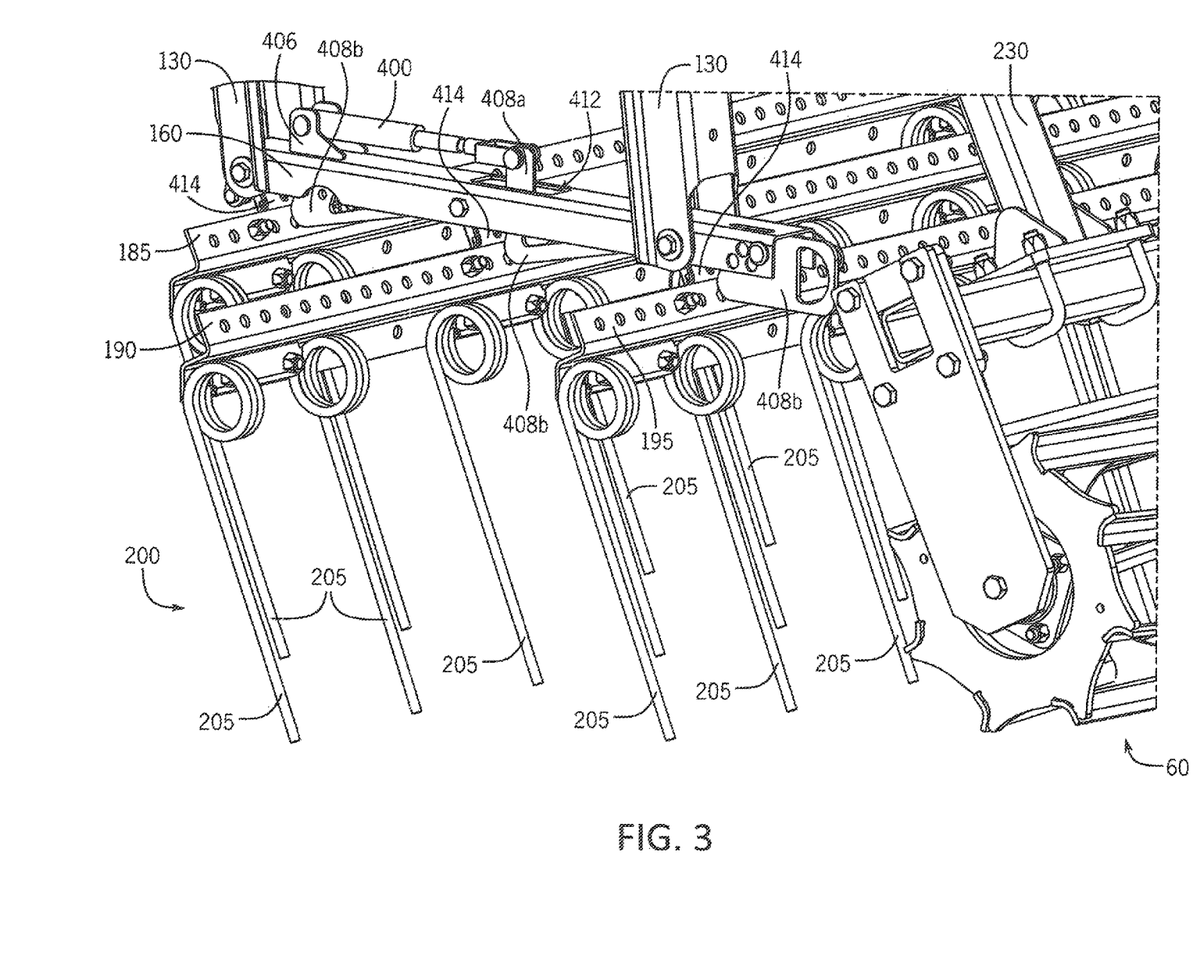
FIG. 3 is an isometric view of the linear actuator and harrow of FIG. 1.
Figure 4:
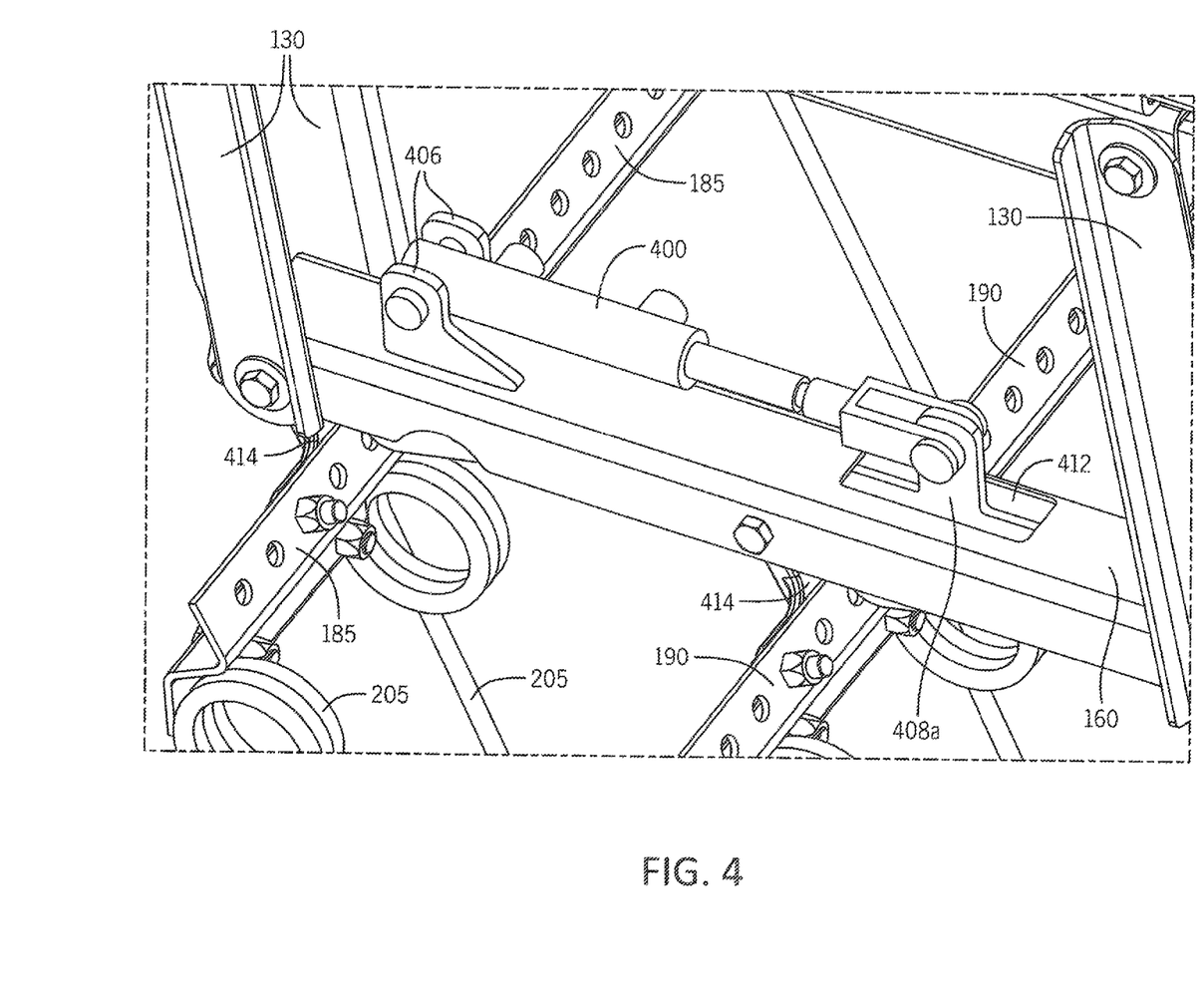
FIG. 4 is a detailed isometric view of the linear actuator and harrow of FIG. 1.
Figure 5:
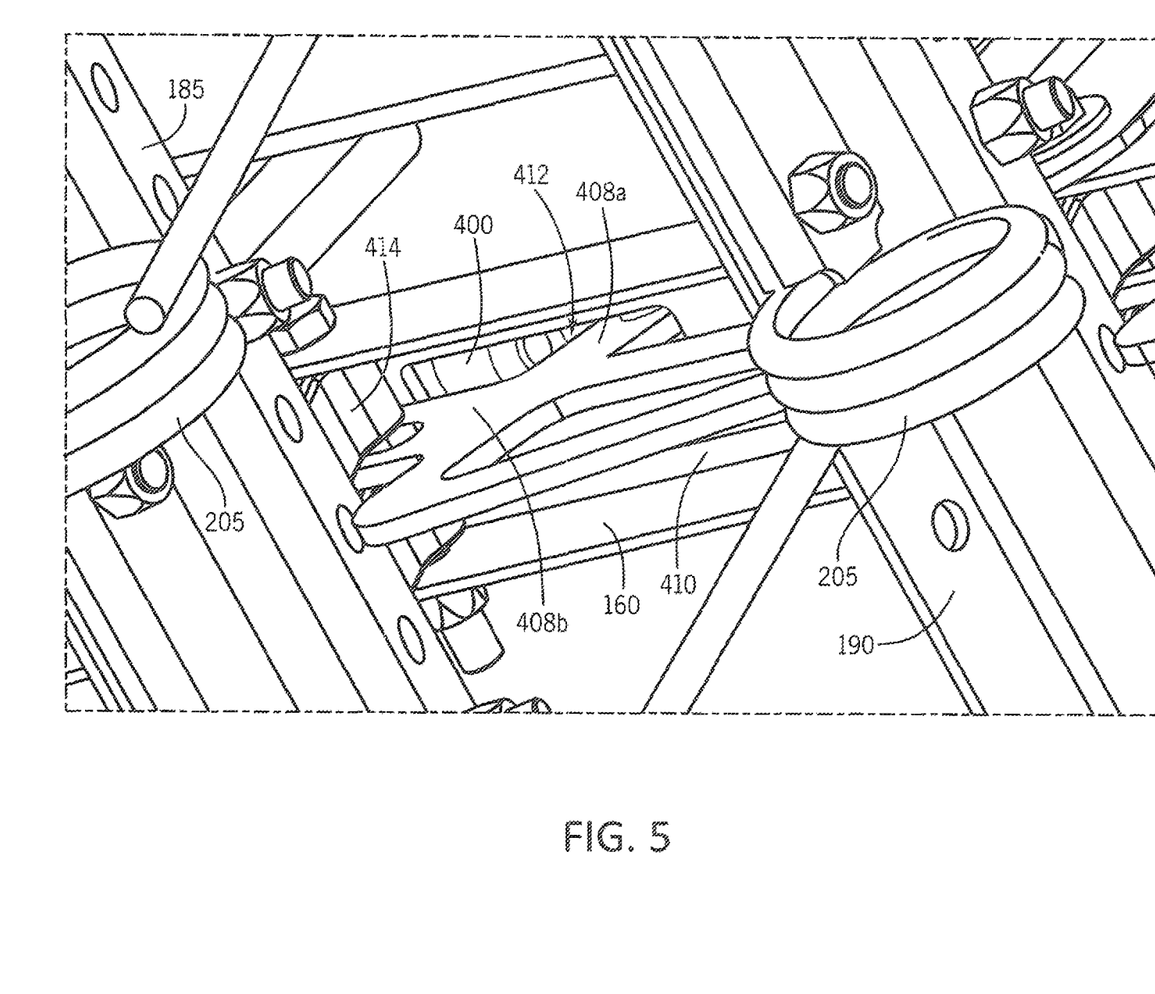
FIG. 5 is a detailed underside isometric view of the harrow of FIG. 1.

Referring now to FIG. 2, each harrow section 70, 75 (FIG. 1) includes at least one harrow arm 80 with front end 85 with bracket 90 arranged at front end 85. Bracket 90 has front section 95 that is attached to the main implement frame 25 and lower flanges 100 arranged on opposite sides of the harrow arm 80 with mounting holes 105 through which pin 110 extends. Lobes 112 extend up and rearward at an angle from bracket front section 95 and lower flanges 100 above harrow arm 80 rearward of pin 110.

Harrow arm 80 may be rectangular tubing with interconnected walls that together provide a box configuration of harrow arm 80. A pair of parallel harrow locating arms 130 provides a parallel linkage system that connects the harrow arm 80 to the rest of harrow 55. Harrow locating arms 130 may include open channel construction(s) defined by a main wall that extends transversely between a pair of side walls.

Harrow locating arms 130 have upper ends that attach to each harrow arm 80 at a corresponding pair of upper harrow locating arm pivot connections 140. Harrow locating arms 130 also have lower ends that connect each harrow arm 80 to harrow frame 150 at a corresponding pair of lower harrow locating arm pivot connections 155 at spaced-apart locations connected to a strut 160 of harrow frame 150. The back lower harrow locating arm pivot connection 155 is arranged at a back end 165 of strut 160, and the front lower harrow locating arm pivot connection 155 is arranged at a front end 170 of strut 160

Upper and lower harrow locating arm pivot connections 140 and 155, respectively, allow the harrow frame 150 to articulate by swinging longitudinally in a back/up and forward/down direction(s) as guided by the pivoting movement of the harrow locating arms 130 with respect to the harrow arm 80 and the harrow frame 150 with respect to the harrow locating arms 130. This allows harrow 55 to define a nonuse position in which harrow frame 150 is generally freely suspended from harrow arm 80, such as when tillage implement 10 (FIG. 1) is raised to remove ground-engaging tillage tools 40 (FIG. 1) out of the soil. Harrow 55 defines an in-use position in which the harrow frame 150 swung back and up, such as when tillage implement 10 (FIG. 1) is being towed through a field and is lowered so ground-engaging tillage tools 40 (FIG. 1) engage and till the soil. During use, harrow locating arms 130 transversely locate harrow frame 150 while harrow 55 is towed by chain(s) 175 (FIG. 2) that are pulled taut while traveling and extends between and connects pin 110 (FIG. 2) in bracket(s) 90 to a front portion of harrow frame 150, such as to front end 170 of strut 160. When in the in-use position, harrow 55 is translated rearwardly with respect to the harrow arm 80, as permitted by chain(s) 175. This may move harrow frame 150 rearwardly so that intermediate bar 190 is arranged generally below locating arm pivot connection 140 of the rear locating arm 130.

Movement of harrow frame 150 may be limited in a forward direction so that the nonuse position defines a forward movement limited position. The forward movement limited position corresponds to a position at which further forward movement of harrow 150 is prevented by limiting arrangement 176, shown here as stop 177. Upper leg 178 is attached to a lower wall of harrow arm 80 and lower leg 179 extends angularly down and rearward from the upper leg 178 so the upper and lower legs 178, 179 intersect each other and define an obtuse angle. A rearward facing surface of lower leg 179 faces and engages a forward facing surface of a main wall of the front locating arm 130 when the harrow frame 150 translates forward so that that stop 177 prevents further motion of harrow frame 150 in the forward direction to define the forward movement limited position as shown in FIG. 2. Limiting arrangement 176 may be arranged so that locating arms 130 angle slightly rearward when the harrow frame 150 is in the nonuse and forward movement limited position.

Struts 160 support multiple bars 180 of harrow frame 150, with the multiple bars 180 arranged transversely across harrow 55, generally perpendicular to struts 160. Harrow 55 is shown here with a three bar configuration in which front bar 185 is arranged toward a front end of harrow 55, intermediate bar 190 arranged behind front bar 185, and a back bar 195 arranged behind both of the front and intermediate bars 185 and 190, respectively toward a back end of harrow 55. Front, intermediate, and back bars 185, 190 and 195, respectively, collectively support a first set of smoothing tools 200 that are configured to smooth the soil tilled by the ground-engaging tillage tools 40. The first set of smoothing tools 200 is represented as tines 205, shown here as spring tines. In alternative aspects, the harrow 55 may have a greater or lesser number of bars.

Tines 205 are spaced from each other and mounted to each of the front, intermediate, and back bars 185, 190, 195. Each of the tines 205 may be a multiple tine component with a pair of tine fingers that extend from spring coils at opposite sides of the tine 205 and a connecting segment that interconnects the coils and is captured by a plate arranged between the coils to mount the tine(s) 205 to a respective bar 185, 190, 195 of harrow frame 150. Different bars 185, 190, 195 may have different numbers of tines 205 mounted to them. For example, front bar 185 may have fewer tines 205 mounted to it than the number of tines 205 mounted to intermediate and/or back bars 190, 195. Tines 205 of different bars 185, 190, 195 may be staggered with respect to each other, with fingers of tines 205 of one of the bars 185, 190, 195 aligned within the gaps between adjacent fingers of tines 205 on a different bar(s) 185, 190, 195. This provides a collective drag path that substantially covers an entire width of a path tilled by main tillage implement 15 so that tines 205 of the three rows of bars 185, 190, 195 as shown can level the soil tilled by tillage tools 40.

Finishing tool arms 210 connect finishing tools 60 to harrow arms 80. Each finishing tool arm 210 may be rectangular tubing with interconnected walls that together provide a box configuration. Finishing tool arm 210 has a straight front segment 220 toward front end 225 and a curved back segment 230 that extends from front segment 220 toward back end 235. In this way, at least a portion of front segment 220 of finishing tool arm 210 overlaps a portion of the harrow arm 80 and the back segment 230 of finishing tool arm 210 extends along a curved path rearward and downward toward back end 235. A support yoke 240 extends upwardly from an upper surface of harrow arm 80 and provides a U-shaped channel in which part of the front segment 220 sits and is transversely restrained when finishing tool arm 210 is in a downward position. Each finishing tool arm 210 includes bracket 245 at front end 225, with a portion of bracket 245 overlapping a corresponding portion of the harrow arm 80. Bracket 245 has a back segment 250 from which finishing tool arm 210 extends and a lower portion 255 with a pair of lower lobes 260 that extend over and sandwich the finishing tool arm 210. A pair of upper lobes 265 extends up and forward at an angle from the lower lobes 260, above and in front of finishing tool arm front end 225. Bracket 245 is arranged to pivot with respect to the harrow arm 80, defining a finishing tool arm pivot connection 270. Finishing tool arm pivot connection 270 defines a pivot axis that extends transversely through harrow arm 80, shown with the pivot axis of finishing tool arm pivot connection 270 arranged generally above intermediate bar 190 when the harrow is in the nonuse position.

Referring again to FIG. 1, finishing tools 60 have a second set of smoothing tools 275 and are shown here as formed bar baskets 280, such as crumbler baskets, that are arranged trailing behind respective harrow sections 70, 75 (FIG. 1). The smoothing tools 275 of formed bar baskets 280 are bars 285 that at least partially define the formed bar baskets 280. Bars 285 may be flat bars, round bars, or curved bars with semicircular or curved cross-sectional shapes. Bars 285 may be spaced from each other and extending helically to collectively define a helically slotted outer circumferential surface of the formed bar baskets 280 that rolls over and further levels soil tilled by tillage tools 40 after having been previously leveled by tines 205.

Formed bar baskets 280 roll over the soil with pressure applied by down pressure system 295, which may be a hydraulic pressure system, and which may be controlled by a control system. The down pressure system 295 may be controlled to provide down pressure to finishing tool 60.

Referring now to FIGS. 2-5, a linear actuator 400, which may be a mechanical actuator, hydraulic actuator, pneumatic actuator, electro-mechanical actuator, and/or some combination thereof, may be connected to the harrow frame 150 to define an angle θ between a first plane 402, horizontal to the harrow frame 150, and second planes 404, defined by the three rows of bars 185, 190, 195, of the first set of smoothing tools 200 for a tilling session. A linear actuator 400 may be provided for each harrow section 70, 75 on the tillage implement 10. In one aspect, a first end of the linear actuator 400 may be connected to a bracket 406 mounted on an upper side of strut 160. A second end of the linear actuator 400 may be connected to an upper portion 408a of slide bar 408. As may best be seen in FIG. 5, a lower portion 408b of the slide bar 408 may be disposed in a U-shaped open channel 410 defined by a main wall that extends transversely between a pair of side walls in a lower side of strut 160. The upper portion 408a of the slide bar 408 protrudes through a slot 412 in the strut 160 for connection to the linear actuator 400, while the lower portion 408b of slide bar 408 extends along the channel 410. The strut 160 may have supports 414 for mounting the three rows of bars 185, 190, 195. As a result, the slide bar 408, in communication with the linear actuator 400 at the upper portion and the three rows of bars 185, 190, 195 at a lower portion, may be operable to define the angle θ of the first set of smoothing tools 200 by stopping a rotation of the three rows of bars 185, 190, 195, beyond a predetermined angle, by pushing or pulling the slide bar 408 via actuation of the linear actuator 400. Accordingly, the linear actuator 400, in cooperation with the slide bar 408, may allow for an infinite range of downward angles to be available for the first set of smoothing tools 200 of the harrow 55 for achieving various effects with the soil.

Figure 6:
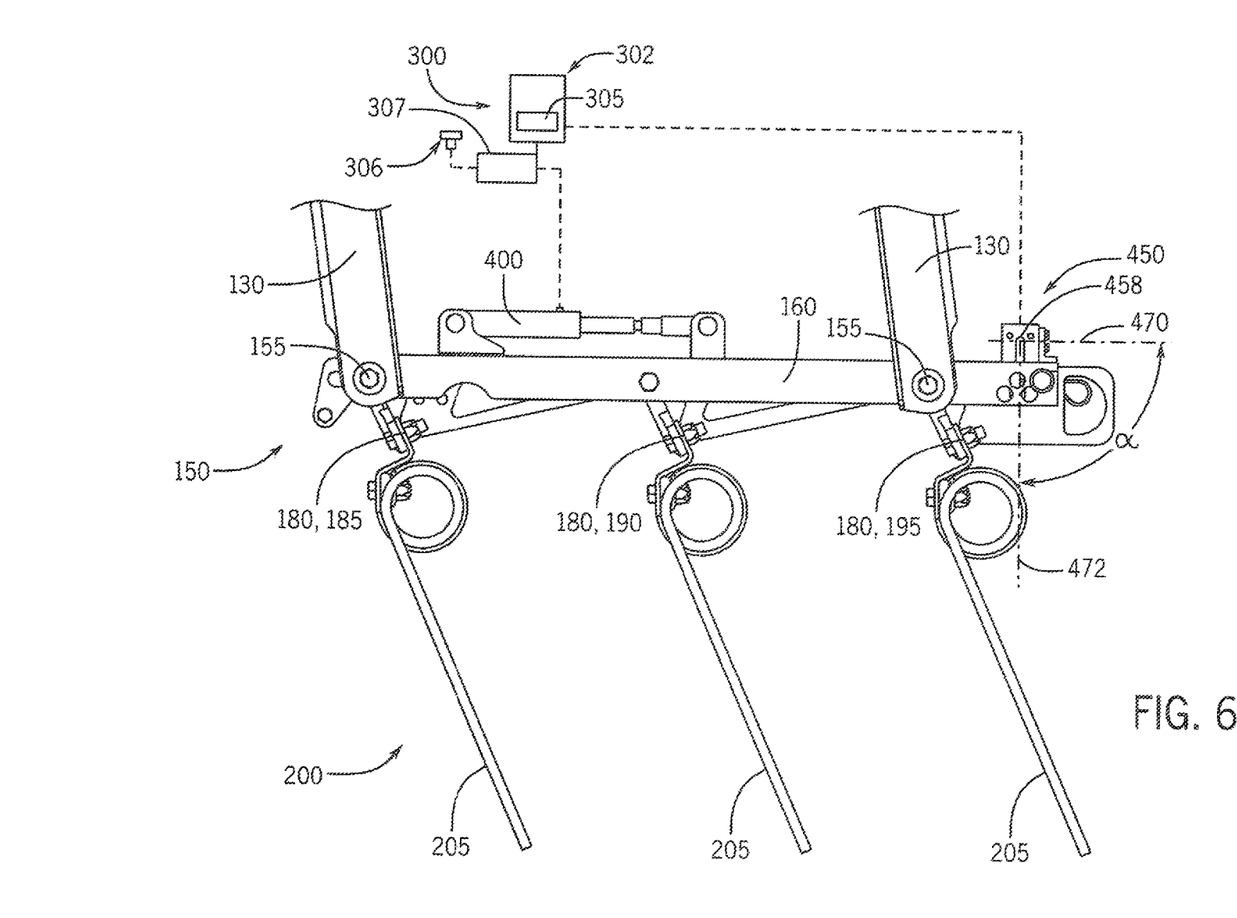
FIG. 6 is a partial side elevation view of the soil finishing system of FIG. 1 with a control system and sensor assembly according to the present invention.
Figure 7:
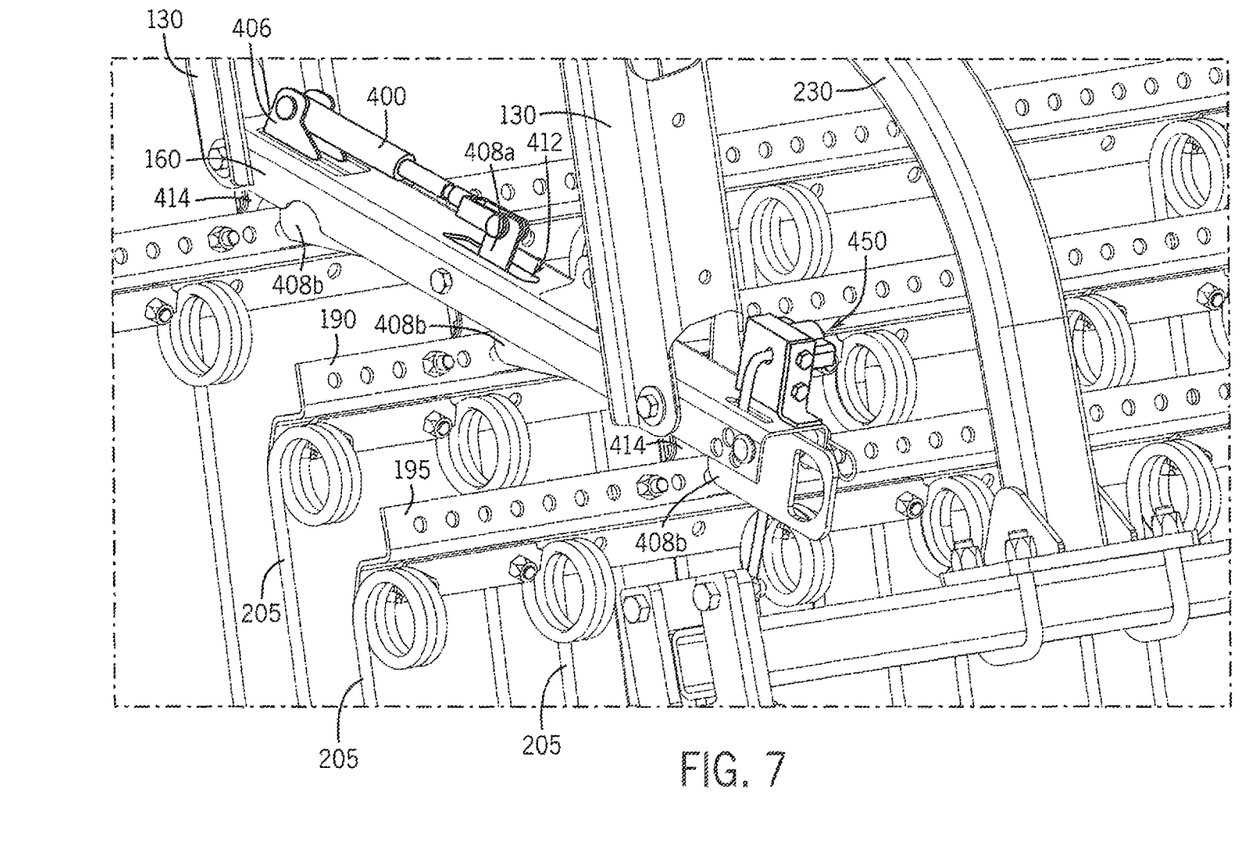
FIG. 7 is an isometric view of the soil finishing system and sensor assembly of FIG. 6.

Referring now to FIG. 6, a control system 300 may include an HMI (human machine interface) configured to allow a user to control the linear actuator 400 and therefore control and adjust the angle θ of the first set of smoothing tools 200 for a tilling session. Control system 300 may include an electronic controller 302 that has at least one master controller or implement controller, shown as controller 305. Controller 305 includes a microprocessor and may be implemented as a PLC (programmable logic controller) or other industrial computer, along with corresponding software and suitable memory for storing such software and hardware including interconnecting conductors for power and signal transmission and communication for controlling electronic, electro-mechanical, pneumatic, and/or hydraulic components, including control valves, actuators, and other components, of the linear actuator 400 or other component of tillage implement 10. In one aspect, control system 300 may be implemented with mechanical controls, such as a knob 306 of a hydraulic control valve 307 in an exemplar hydraulic system, which can be manually operated to control and adjust the distance provided by linear actuator 400. The HMI and/or control knob 306 are typically mounted within a cab of the tractor that tows tillage implement 10 (FIG. 1) so the operator can adjust the angle of the first set of smoothing tools 200 from within the cab, although it is understood that they may be mounted on the tillage implement 10 (FIG. 1) itself.

Figure 8:
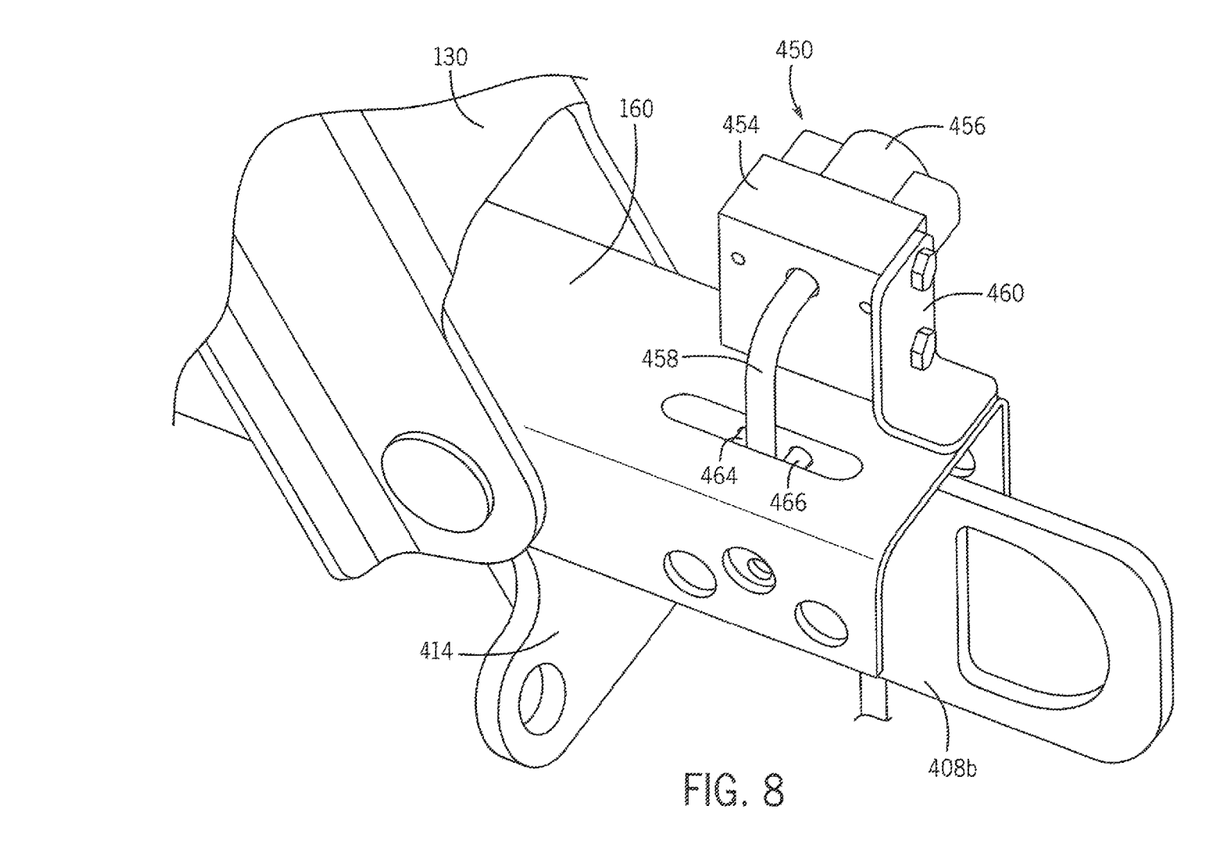
FIG. 8 is a detailed isometric view of the sensor assembly of FIG. 6.
Figure 9:
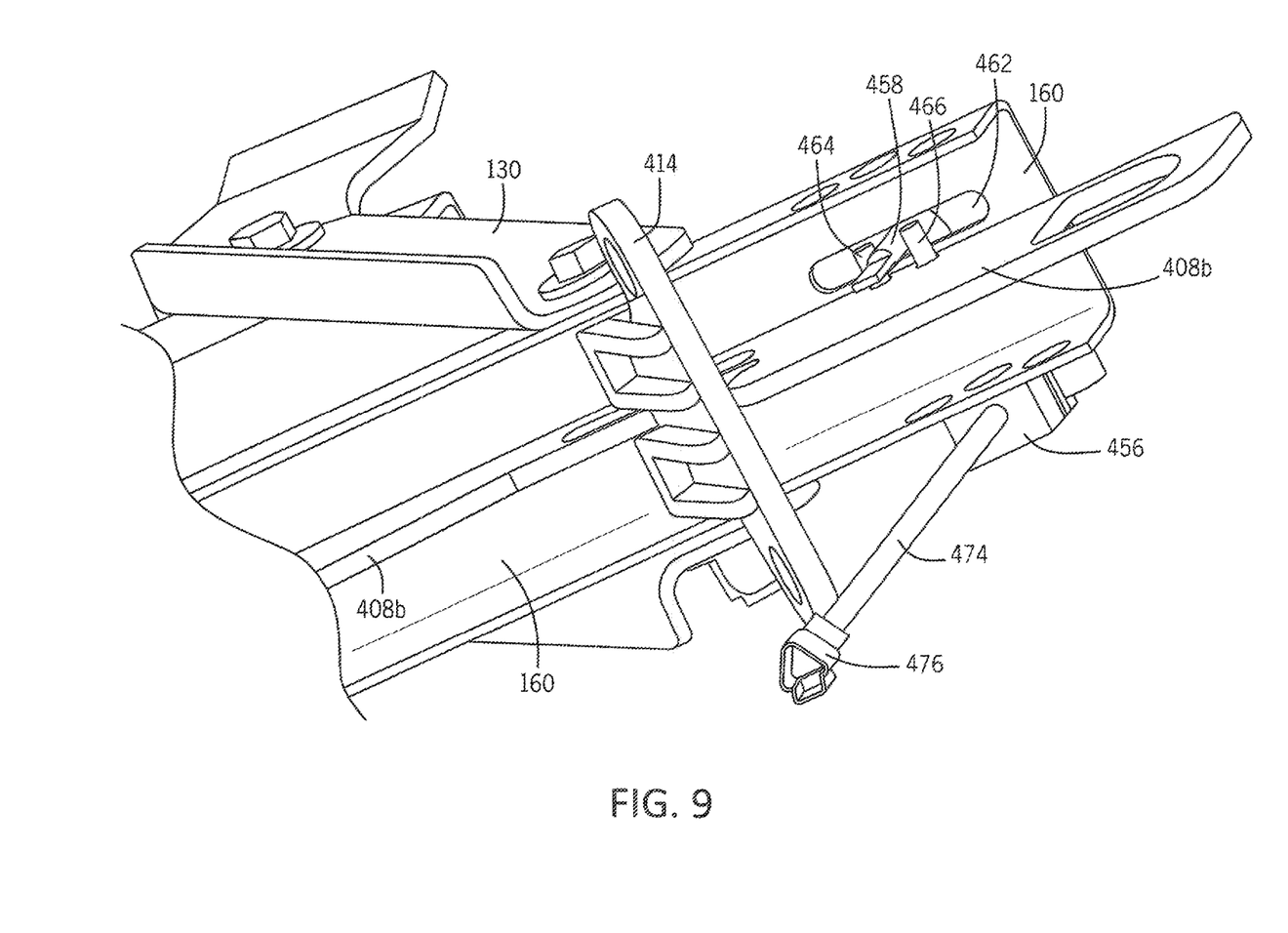
FIG. 9 is a detailed underside isometric view of the sensor assembly of FIG. 6.
Figure 10:
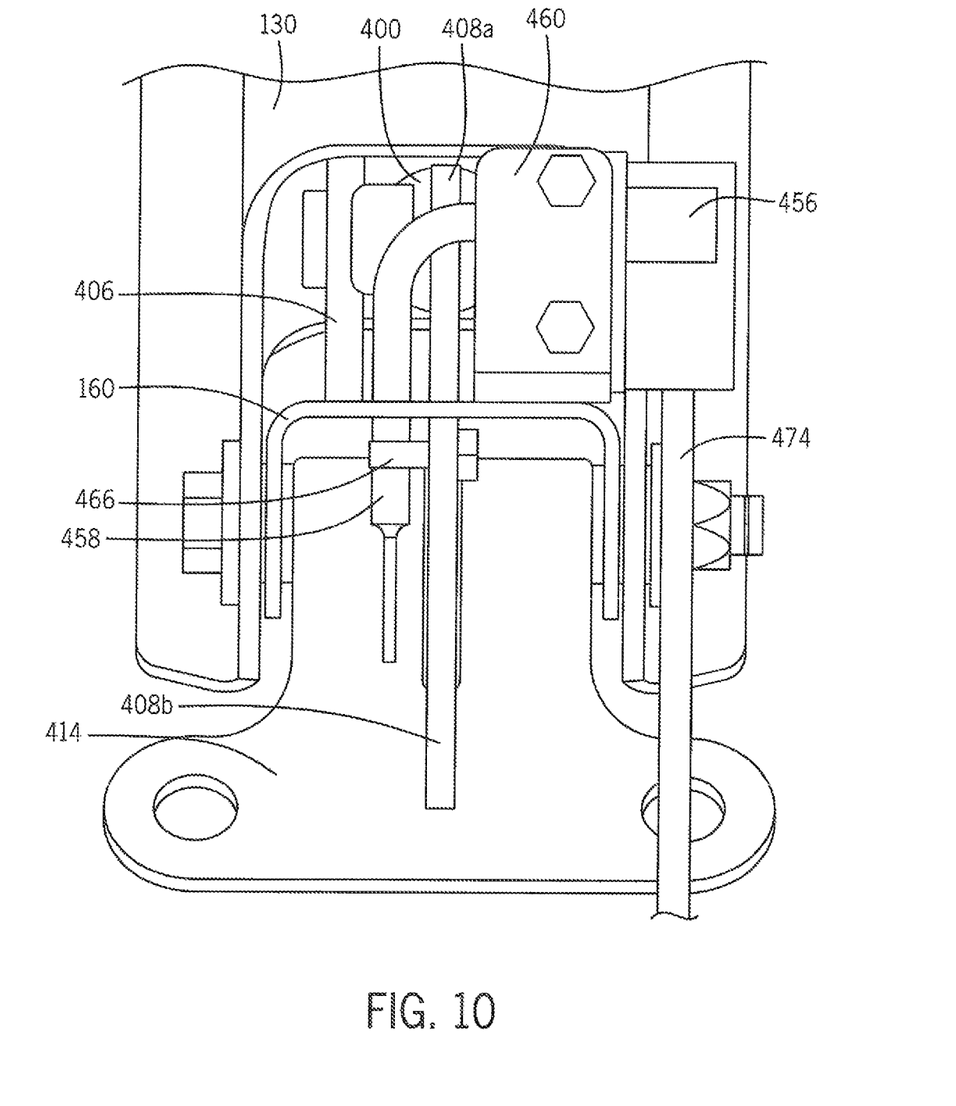
FIG. 10 is a detailed rear view of the sensor assembly of FIG. 6.

A sensor assembly 450 may be connected to the harrow frame 150 to generate an electrical signal 452 corresponding to the angle θ of the first set of smoothing tools 200. Like the linear actuator 400, the sensor assembly 450 may be provided for each harrow section 70, 75 on the tillage implement 10. With additional reference to FIGS. 7-10, the sensor assembly 450 may be connected to the harrow frame 150, such as via a bracket 460 mounted on an upper side of strut 160 (see FIGS. 8 and 10). The sensor assembly 450 may include a housing 454 supporting a sensor 456 as may be best viewed in FIG. 8. The sensor 456 could be a rotary position sensor for sensing an angle, and could consist of, by way of example, a magnetic sensor having multiple magnets, a potentiometer sensor, and/or an optical sensor having a light source and receiver, as known in the art. In alternative aspects, the sensor 456 could be a linear position sensor for sensing a traveled distance.

In one aspect, for a rotary position sensor, the sensor assembly 450 could include a pivoting arm 458 in communication with the sensor 456. The pivoting arm 458 may protrude through a slot 462 in the strut 160, so that the pivoting arm 458 may be disposed between first and second pins 464 and 466, respectively, attached to the lower portion 408b of the slide bar 408 disposed in the channel 410 (see FIG. 9). Accordingly, movement of the slide bar 408 may cause at least one of the first and second pins 464 and 466, respectively, to rotate the pivoting arm 458, which rotation may be sensed by the sensor 456. For example, in a first (rearward) motion of the slide bar 408, which may be caused by the linear actuator 400 adjusting the angle θ of the first set of smoothing tools 200 to a first position, the first pin 464 may cause the pivoting arm 458 to rotate rearward and upward. However, in a second (forward) motion of the slide bar 408, which may be caused by the linear actuator 400 adjusting the angle θ of the first set of smoothing tools 200 to a second position, the second pin 466 may cause the pivoting arm 458 to rotate forward and upward.

Referring again to FIG. 6, the angular travel of the pivoting arm 458 between a third plane 470, horizontal to the harrow frame 150, and a fourth plane 472, defined by the pivoting arm 458, defines a sensor angle α. Accordingly, by sensing the sensor angle α which is defined between a plane that is parallel to the first plane 402 (also horizontal to the harrow frame 150) and a plane that is controlled by the slide bar 408 (and used to define the second planes 404 defined by the three rows of bars 185, 190, 195), the sensor angle α may be used to correspond to the angle θ of the first set of smoothing tools 200 (see FIGS. 2 and 6). In other words, movement of the slide bar 408, by the linear actuator 400, adjusts both the angle θ and the sensor angle α in a proportional manner.

Upon sensing the sensor angle α, the electrical signal 452, which reflects the sensor angle α, can be sent to the control system 300, such as via an ISO or CAN bus as known in the art, which may be connected to the tillage implement 10 via wiring conduit 474 and wiring harness 476. The control system 300 may process the sensor angle α to correspond to the angle θ. Accordingly, the control system 300 may continuously monitor the electrical signal 452 and actuate the linear actuator 400 in response to the electrical signal 452 to provide continuous adjustment of the first set of smoothing tools 200 to maintain a desired tine angle setting during a tilling session. This may help to achieve the most aggressive setting for optimum field leveling and residue flow based on field conditions. In addition, the control system 300 may display the electrical signal 452 to an operator in the tractor cab, such as via the HMI, so that the operator can monitor the angle of the first set of smoothing tools 200 and provide manual adjustments via the linear actuator 400 as desired.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:
1. An agricultural tillage implement, comprising:
   a main implement frame supporting a set of ground-engaging tillage tools for tilling soil during a tilling session for seedbed preparation;
   a soil finish system supported by the main implement frame for smoothing the soil tilled by the ground-engaging tillage tools, the soil finish system including:
   (a) a harrow supported in a trailing position with respect to the main implement frame, wherein the harrow includes a harrow frame with multiple bars arranged generally transversely with respect to a travel direction of the agricultural tillage implement, wherein the multiple bars support a first set of smoothing tools for smoothing the soil tilled by the ground-engaging tillage tools; and
   (b) a hydraulic system configured to define an angle of the first set of smoothing tools for the tilling session; and
   (c) a sensor assembly supported by the harrow frame and in communication with the hydraulic system the sensor assembly including a pivoting arm movable in conjunction with the movement of the first set of smoothing tools and is configured to generate an electrical signal corresponding to the angle of the first set of smoothing tools.

2. The agricultural tillage implement of claim 1, further comprising a control system in communication with the hydraulic system, wherein the control system is configured to actuate the hydraulic system to define the angle of the first set of smoothing tools.

3. The agricultural tillage implement of claim 2, wherein the sensor assembly sends the electrical signal to the control system, and the control system actuates the hydraulic system in response to the electrical signal.

4. The agricultural tillage implement of claim 2, wherein the sensor assembly comprises a rotary position sensor.

5. The agricultural tillage implement of claim 2, wherein the sensor assembly comprises at least one of a plurality of magnets and a potentiometer.

6. The agricultural tillage implement of claim 1, further comprising a finishing tool supported in a trailing position with respect to the harrow with the finishing tool including a second set of smoothing tools for smoothing the soil tilled by the ground-engaging tillage tools.

7. An agricultural tillage implement, comprising:
 a main implement frame supporting a set of ground-engaging tillage tools for tilling soil during a tilling session for seedbed preparation;
 a soil finish system supported by the main implement frame for smoothing the soil tilled by the ground-engaging tillage tools, the soil finish system including:
  a harrow supported in a trailing position with respect to the main implement frame, wherein the harrow includes a harrow frame with multiple bars arranged generally transversely with respect to a travel direction of the agricultural tillage implement, wherein the multiple bars support a first set of smoothing tools fro smoothing the soil tilled by the ground-engaging tillage tools;
  a hydraulic system configured to define an angle of the first set of smoothing tools for the tilling session;
  a sensor assembly in communication with the hydraulic system, wherein the sensor assembly is configured to generate an electrical signal corresponding to the angle of the first set of smoothing tools; and
  a slide bar in communication with the hydraulic system, the slide bar being operable to define the angle of the first set of smoothing tools by stopping a rotation of the multiple bars upon actuation by the hydraulic system.

8. The agricultural tillage implement of claim 7, wherein the sensor assembly is in communication with the slide bar for sensing a sensor angle corresponding to the angle of the first set of smoothing tools.

9. The agricultural tillage implement of claim 7, wherein the slide bar includes first and second pins and the sensor assembly includes a pivoting arm disposed between the first and second pins, wherein a movement of the slide bar causes at least one of the first and second pins to rotate the pivoting arm to produce the sensor angle.

10. The agricultural tillage implement of claim 9, wherein the harrow frame includes a strut having supports for mounting the multiple bars, and the strut includes a channel for providing the slide bar therein.

11. The agricultural tillage implement of claim 10, wherein the strut supports a bracket on a first side of the strut for mounting the sensor assembly, and the strut includes a slot for providing the pivoting arm there through for disposing the pivoting arm between the first and second pins.

12. The agricultural tillage implement of claim 11, wherein the harrow is a spring tine harrow with each of the multiple bars supporting spring tines that define the first set of smoothing tools.

13. An agricultural tillage implement, comprising:
 a main implement frame supporting a set of ground-engaging tillage tools for tilling soil during a tilling session for seedbed preparation; and
 a soil finish system supported by the main implement frame for smoothing the soil tilled by the ground-engaging tillage tools, the soil finish system including:
 (a) a harrow supported in a trailing position with respect to the main implement frame, wherein the harrow includes a harrow frame with multiple bars arranged generally transversely with respect to a travel direction of the agricultural tillage implement with the multiple bars of the harrow flame including a front bar arranged toward a front end of the harrow, a back bar arranged toward a back end of the harrow, and an intermediate bar arranged between the front and back bars of the harrow, wherein the harrow includes a first set of smoothing tools supported by the front, back, and intermediate bars of the harrow frame for smoothing the soil tilled by the ground-engaging tillage tools;
 (b) a hydraulic system configured to define an angle of the first set of smoothing tools for the tilling session;
 (c) a sensor assembly supported by the harrow frame and in communication with the hydraulic system, the sensor assembly including a pivoting arm movable in conjunction with the movement of the first set of smoothing tools and is configured to generate an electrical signal corresponding to the angle of the first set of smoothing tools; and
 (d) a finishing tool supported in a trailing position with respect to the harrow with the finishing tool including a second set of smoothing tools for smoothing the soil tilled by the ground-engaging tillage tools.

14. The agricultural tillage implement of claim 13, further comprising a control system in communication with the hydraulic system, wherein the control system is configured to actuate the hydraulic system to define the angle of the first set of smoothing tools.

15. The agricultural tillage implement of claim 14, wherein the sensor assembly sends the electrical signal to the control system, and the control system actuates the hydraulic system in response to the electrical signal.

16. An agricultural tillage implement, comprising:
 a main implement frame supporting a set of ground-engaging tillage tools for tilling soil during a tilling session for seedbed preparation; and
 a soil finish system supported by the main implement frame for smoothing the soil tilled by the ground-engaging tillage tools, the soil finish system including:
  a harrow supported in a trailing position with respect to the main implement frame, wherein the harrow includes a harrow frame with multiple bars arranged generally transversely with respect to a travel direction of the agricultural tillage implement with the multiple bars of the harrow frame including a front bar arranged toward a front end of the harrow, a back bar arranged toward a back end of the harrow, and an intermediate bar arranged between the front and back bars of the harrow, wherein the harrow includes a first set of smoothing tools supported by the front, back, and intermediate bars of the harrow frame for smoothing the soil tilled by the ground-engaging tillage tools;
  a hydraulic system configured to define an angle of the first set of smoothing tools for the tilling session;
  a sensor assembly in communication with the hydraulic system, wherein the sensor assembly is configured to generate an electrical signal corresponding to the angle of the first set of smoothing tools;
  a finishing tool supported in a trailing position with respect to the harrow with the finishing tool including a second set of smoothing tools for smoothing the soil tilled by the ground-engaging tillage tools; and a slide bar in communication with the hydraulic system, the slide bar being operable to define the angle of the first set of smoothing tools by stopping a rotation of the multiple bars upon actuation by the hydraulic system.

17. The agricultural tillage implement of claim 16, wherein the sensor assembly is in communication with the slide bar for sensing a sensor angle corresponding to the angle of the first set of smoothing tools.

18. The agricultural tillage implement of claim 17, wherein the slide bar includes first and second pins and the sensor assembly includes a pivoting arm disposed between the first and second pins, wherein a movement of the slide bar causes at least one of the first and second pins to rotate the pivoting arm to produce the sensor angle.

19. The agricultural tillage implement of claim 18, wherein the harrow frame includes a strut having supports for mounting the multiple bars, and the strut includes a channel for providing the slide bar therein.

20. The agricultural tillage implement of claim 19, wherein the strut supports a bracket on a first side of the strut for mounting the sensor assembly, and the strut includes a slot for providing the pivoting arm there through for disposing the pivoting arm between the first and second pins.

\* \* \* \* \*